United States Patent
Williams et al.

(10) Patent No.: US 6,726,435 B1
(45) Date of Patent: Apr. 27, 2004

(54) LIFT FOR A PERSONAL MOBILITY VEHICLE OR WHEELCHAIR

(75) Inventors: Chad Williams, Sarasota, FL (US); Jeff DuVal, Sarasota, FL (US)

(73) Assignee: Chadco Enterprises, Inc., FL (US)

( * ) Notice: Subject to any disclaimer, the term of this patent is extended or adjusted under 35 U.S.C. 154(b) by 0 days.

(21) Appl. No.: 10/267,260

(22) Filed: Oct. 8, 2002

(51) Int. Cl.[7] .................................................. B60P 1/00
(52) U.S. Cl. ...................... 414/542; 414/497; 414/560; 414/921
(58) Field of Search ................. 414/495–497, 414/542, 560, 921

(56) References Cited

U.S. PATENT DOCUMENTS

| | | |
|---|---|---|
| 4,140,230 A | 2/1979 | Pearson |
| 4,408,948 A | 10/1983 | Robinson |
| 4,984,955 A | 1/1991 | McCullough |
| 5,261,779 A | 11/1993 | Goodrich |
| 5,308,214 A * | 5/1994 | Crain et al. ............ 414/921 |
| 5,401,135 A | 3/1995 | Stoen et al. |
| 5,556,250 A | 9/1996 | Fretwell et al. |
| 5,564,884 A | 10/1996 | Farsai |
| 5,672,041 A | 9/1997 | Ringdahl et al. |
| 5,674,043 A | 10/1997 | Dorn |
| 5,806,632 A | 9/1998 | Budd et al. |
| 5,944,473 A | 8/1999 | Saucier et al. |
| 6,086,314 A | 7/2000 | Savaria |
| 6,357,992 B1 | 3/2002 | Ringdahl et al. |
| 6,379,102 B1 | 4/2002 | Kameda |
| 2001/0026756 A1 | 10/2001 | Mortimore |

* cited by examiner

Primary Examiner—Joseph E. Valenza
(74) Attorney, Agent, or Firm—Charles J. Prescott

(57) ABSTRACT

A personal mobility vehicle lift for a vehicle having a door opening and a floor. The personal mobility vehicle lift includes a platform for supporting a personal mobility vehicle (PMV) thereatop. An upright preferably telescoping lift mechanism raises and lowers the platform in an up and down motion. An elongated stationary frame member is structured for connection atop and oriented preferably parallel to the floor of the vehicle. An elongated moveable frame member is connected to the stationary frame member preferably for reciprocal lengthwise movement. The moveable frame member is connected to the lift mechanism for reciprocal lengthwise movement. A drive mechanism operably interconnects the stationary and moveable members and the lift member whereby, when the platform is in the upper position, the platform is moveable from its outside position through the door opening into the vehicle.

3 Claims, 4 Drawing Sheets

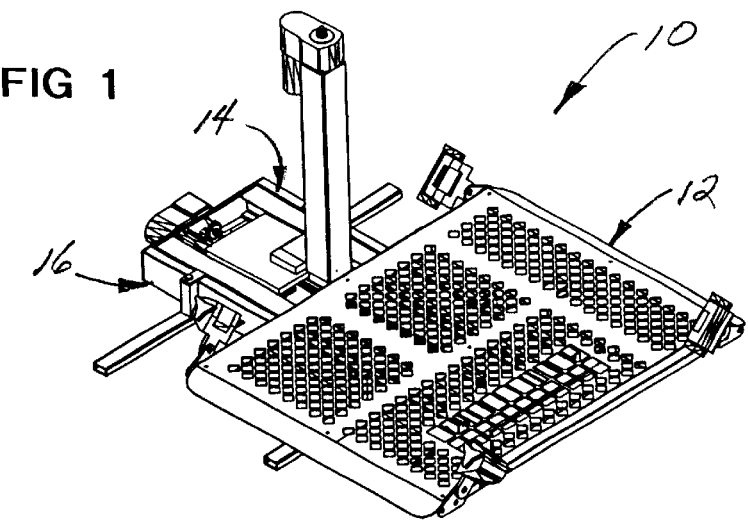
FIG 1
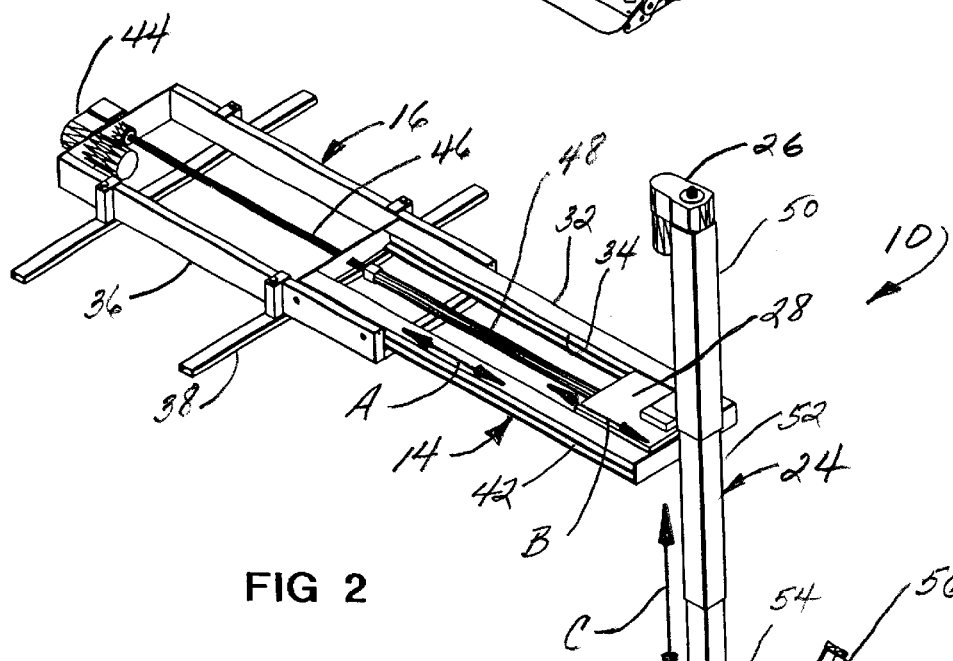
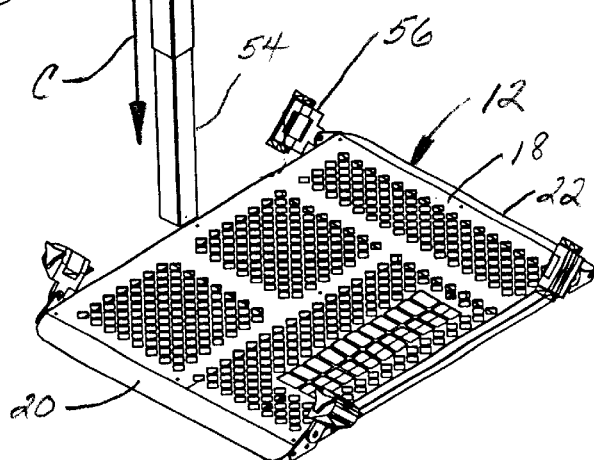
FIG 2

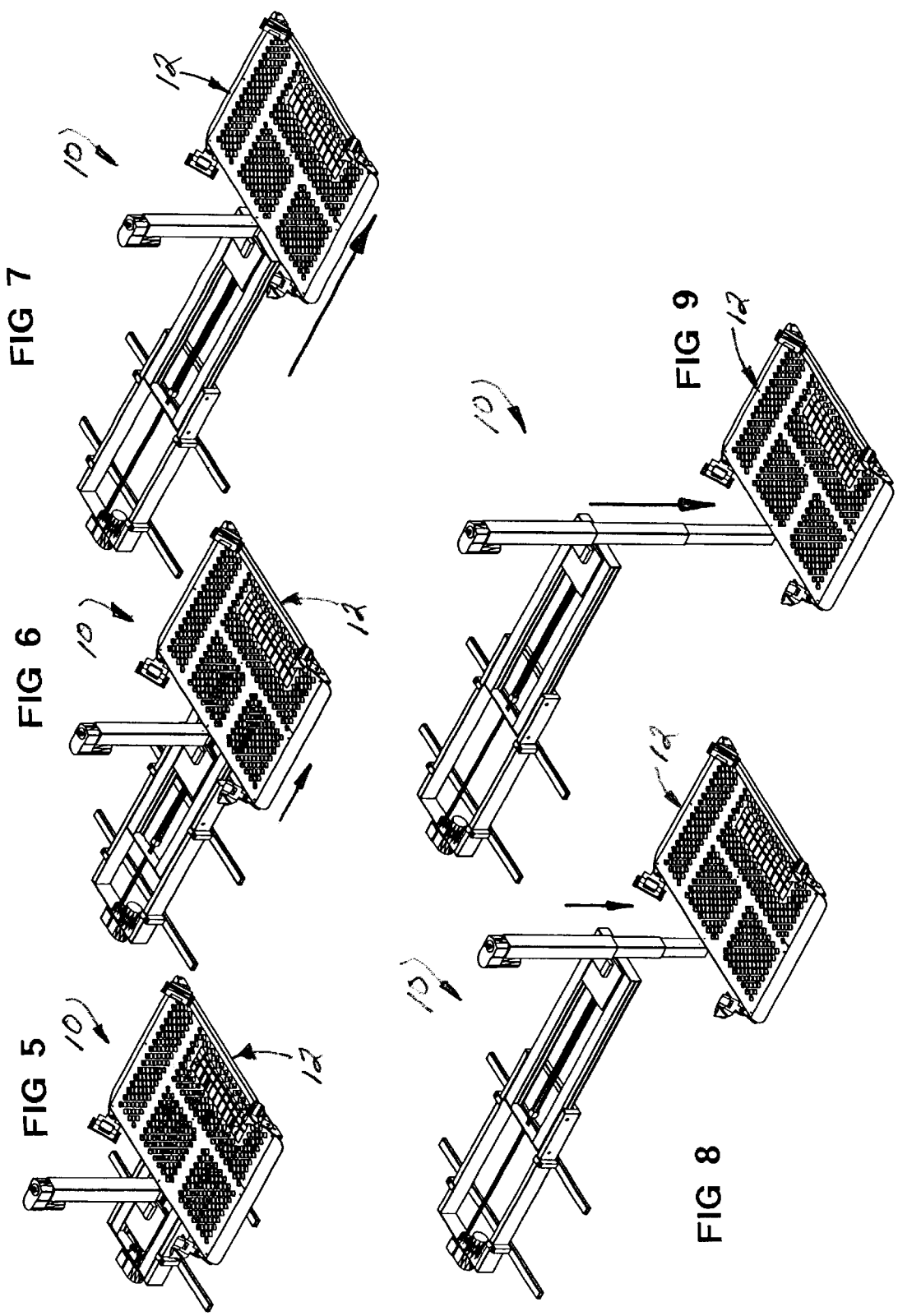

LIFT FOR A PERSONAL MOBILITY VEHICLE OR WHEELCHAIR

CROSS-REFERENCE TO RELATED APPLICATIONS

Not applicable

STATEMENT REGARDING FEDERALLY SPONSORED RESEARCH OR DEVELOPMENT

Not Applicable

INCORPORATION-BY-REFERENCE OF MATERIAL SUBMITTED ON A COMPACT DISC

Not Applicable

BACKGROUND OF THE INVENTION

This invention relates generally to lifts for personal mobility vehicles and more particularly to a powered personal mobility vehicle lift connectable to the floor of a vehicle such as a utility van for loading and offloading the personal mobility vehicle through the back or side door opening of the vehicle.

The popularity of personal mobility vehicles such as powered wheelchairs and powered scooters, collectively referred to herein as personal mobility vehicles is rapidly increasing. Those physically challenged who were once relegated to indoor use of an unpowered wheelchair are now much more mobile in such three and four wheeled motorized personal mobility vehicles. However, there has been another barrier in utilizing conventional cars and vans with respect to the loading and offloading of these relatively heavier and more complex powered personal mobility vehicles. One answer has come in the form of custom "minivan" conversions wherein a power ramp is installed into the center portion of the van which, when lowered and deployed, allows the personal mobility vehicle to be driven into the van after which the ramp is powered into a closed, upright, stored position.

The financial drawback to such van conversions is substantial as the entire floor structure must be completely revamped, lowered and reinforced in order to have sufficient headroom within the vehicle.

Those who use powered personal mobility vehicles and who are able to ambulate short distances or are accompanied by a physically able companion, now have a selection of lift mechanism options which are connected to the floor of the vehicle. These options permit the loading and offloading of the personal mobility vehicle to and from a lift platform which is power controlled. The lift platform is moveable into and from the van between a position within the vehicle atop or in proximity to the floor thereof to a position rearwardly of the vehicle wherein the platform is lowered to near ground level so that the personal mobility vehicle may then be driven or rolled therefrom.

The following patents generally describe inventions known to applicant which accomplish this task in various ways:

Saucier, et al. U.S. Pat. No. 5,944,473
McCullough U.S. Pat. No. 4,984,955
Pearson U.S. Pat. No. 4,140,230
Goodrich U.S. Pat. No. 5,261,779
Ringdahl et al. U.S. Pat. No. 5,672,041
Budd et al. U.S. Pat. No. 5,806,632
Farsai U.S. Pat. No. 5,564,884
Ringdahl et al. U.S. Pat. No. 6,357,992
Savaria U.S. Pat. No. 6,086,314
Kameda U.S. Pat. No. 6,379,102
Stoen et al. U.S. Pat. No. 5,401,135
Fretwell et al. U.S. Pat. No. 5,556,250
Dorn U.S. Pat. No. 5,674,043

A pending patent application published on Oct. 4, 2001, publication number U.S. 2001/0026756 invented by Mortimore also teaches a lift for a motorized vehicle which generally also accomplishes this function, but which utilizes a parallelogram type lifting arm arrangement requiring substantially more space within the interior of the vehicle itself when the device is in a stored position.

The present invention provides a lift for a personal mobility vehicle which utilizes only linear sliding or roller supported motion of its various components, to horizontally retract and extend the platform which supports the personal mobility vehicle. A very compact upright telescoping lift mechanism used to raise and lower the platform provides space saving and reduces the distance required behind the vehicle for accessibility to loading and offloading the personal mobility vehicle therefrom.

BRIEF SUMMARY OF THE INVENTION

This invention is directed to a personal mobility vehicle lift for use in conjunction with a vehicle having a rear or side door opening and a floor. The personal mobility vehicle lift includes a generally horizontal platform structured to support a powered personal mobility vehicle driven or rolled thereatop. An upright preferably telescoping powered lift mechanism is connected to the platform for raising and lowering the platform when positioned rearwardly behind the vehicle in a linear motion from a lower position in proximity to the ground to an upper position in proximity to the level of the floor. An elongated stationary frame member is structured for connection atop and oriented lengthwise or fore and aft to the floor of the vehicle. An elongated moveable frame member is slidably or rollably connected to the stationary frame member for lengthwise rearward movement therebetween. Said moveable frame member is connected to the lift member for limited additional rolling or sliding movement lengthwise therebetween. A drive mechanism is operably interconnected between the stationary and moveable members and the lift member for controlling relative linear fore and aft movement therebetween whereby, when the platform is in the upper position, the platform is controlledly moveable linearly from its rearward position beyond the floor and the rear of the vehicle through the door opening to a forward position above or atop the floor and within the vehicle.

It is therefore an object of this invention to provide a power lift mechanism for personal mobility vehicles utilizing compact and economically efficient components which telescope to effect the vertical lifting and for and aft or horizontal movement of the platform required to load and offload the personal mobility vehicle onto and from the platform.

Still another object of this invention is to provide a lift mechanism for personal mobility vehicles which, through the use of telescoping horizontal and vertical translation of the various components, adds compactness to the invention when stored within the vehicle.

In accordance with these and other objects which will become apparent hereinafter, the instant invention will now be described with reference to the accompanying drawings.

BRIEF DESCRIPTION OF THE SEVERAL VIEWS OF THE DRAWING(S)

DETAILED DESCRIPTION OF THE INVENTION

Figure 2:
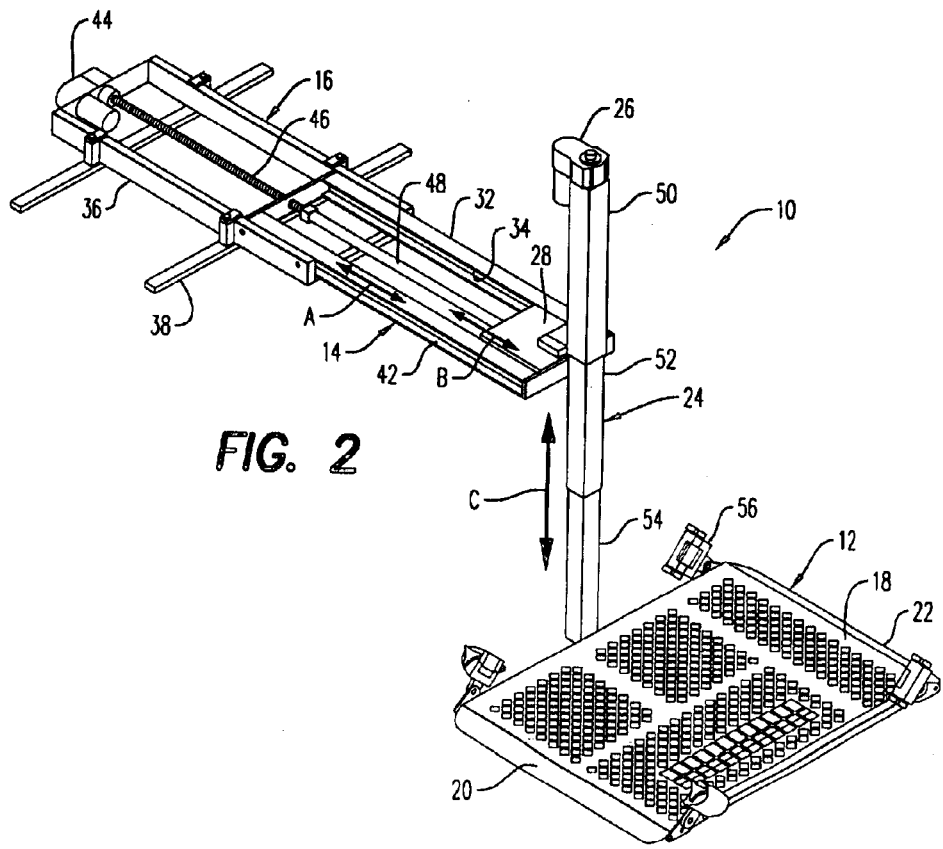
FIG. 2 is a perspective view of the invention in its fully deployed orientation.
Figure 3:
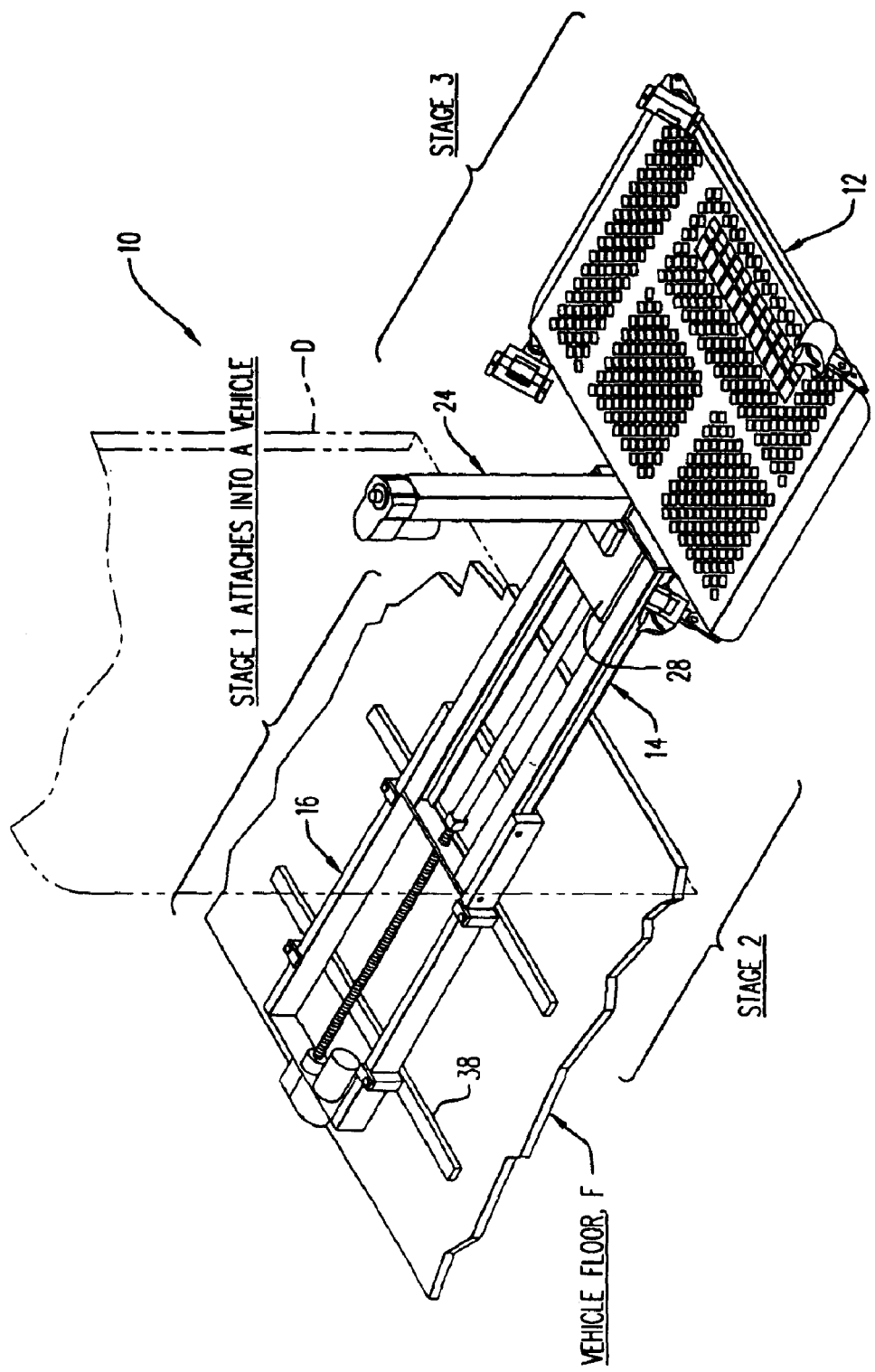
Figure 4:
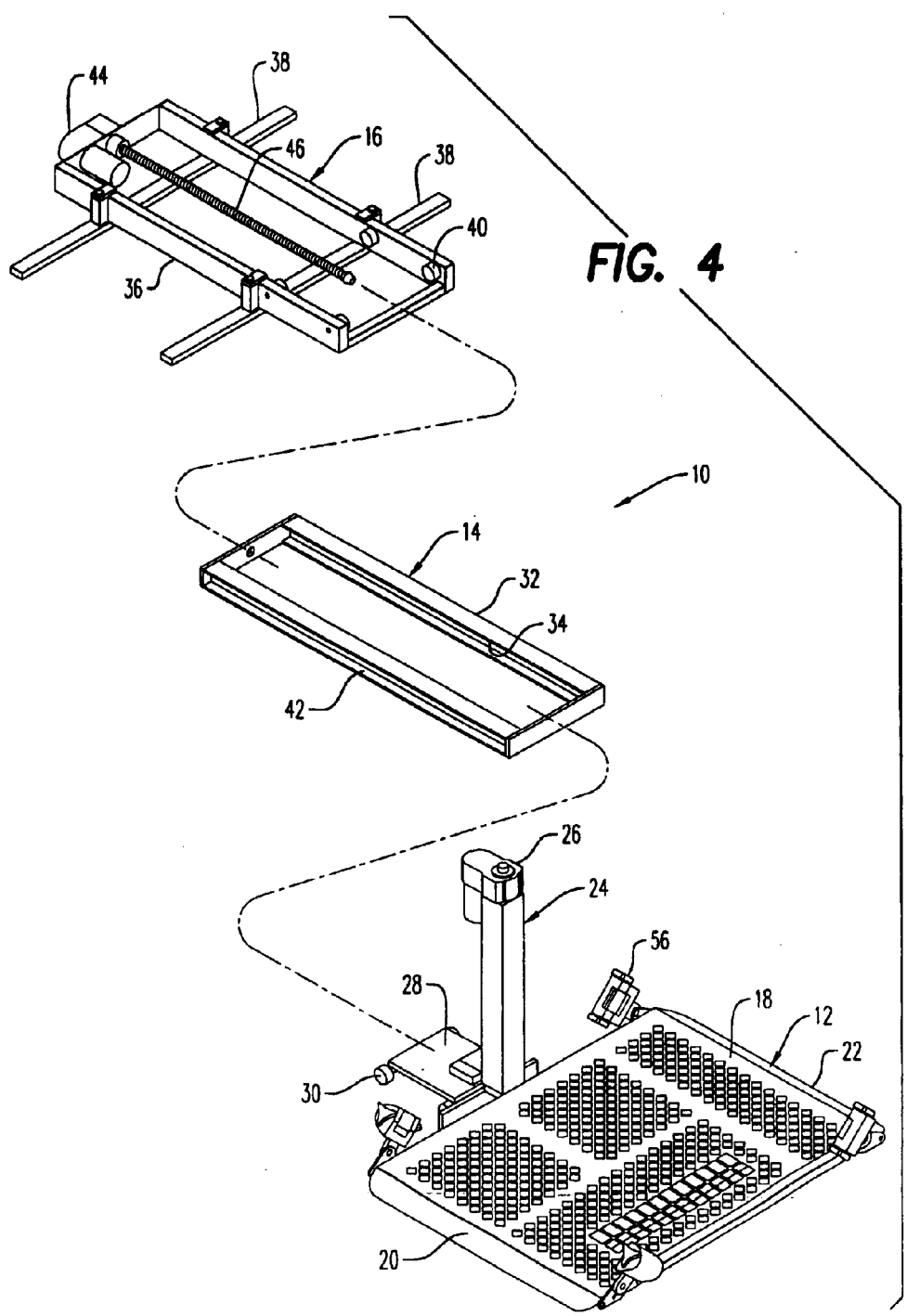

Referring now to the drawings, the invention is generally shown at numeral 10 and includes a flat horizontal platform 12 having a support surface 18 sized to supportively receive a power wheel chair or personal mobility vehicle (PMV). As shown in FIG. 2 with the platform 12 in its lowered configuration, tapered ramps 20 and 22 facilitate driving or rolling the personal mobility vehicle onto the platform 12 into a central balanced position. Thereafter, retractable safety restraining strap mechanisms 56, such as those commercially available under the trademark "Q-STRAINT", Model QRT, from Q-Straint of Ft. Lauderdale, Fla., are utilized to restrain the PMV and secure orientation atop the platform 12. The support surface 18 is preferably formed of perforated or partially expanded flat steel or aluminum plate.

Figure 3:
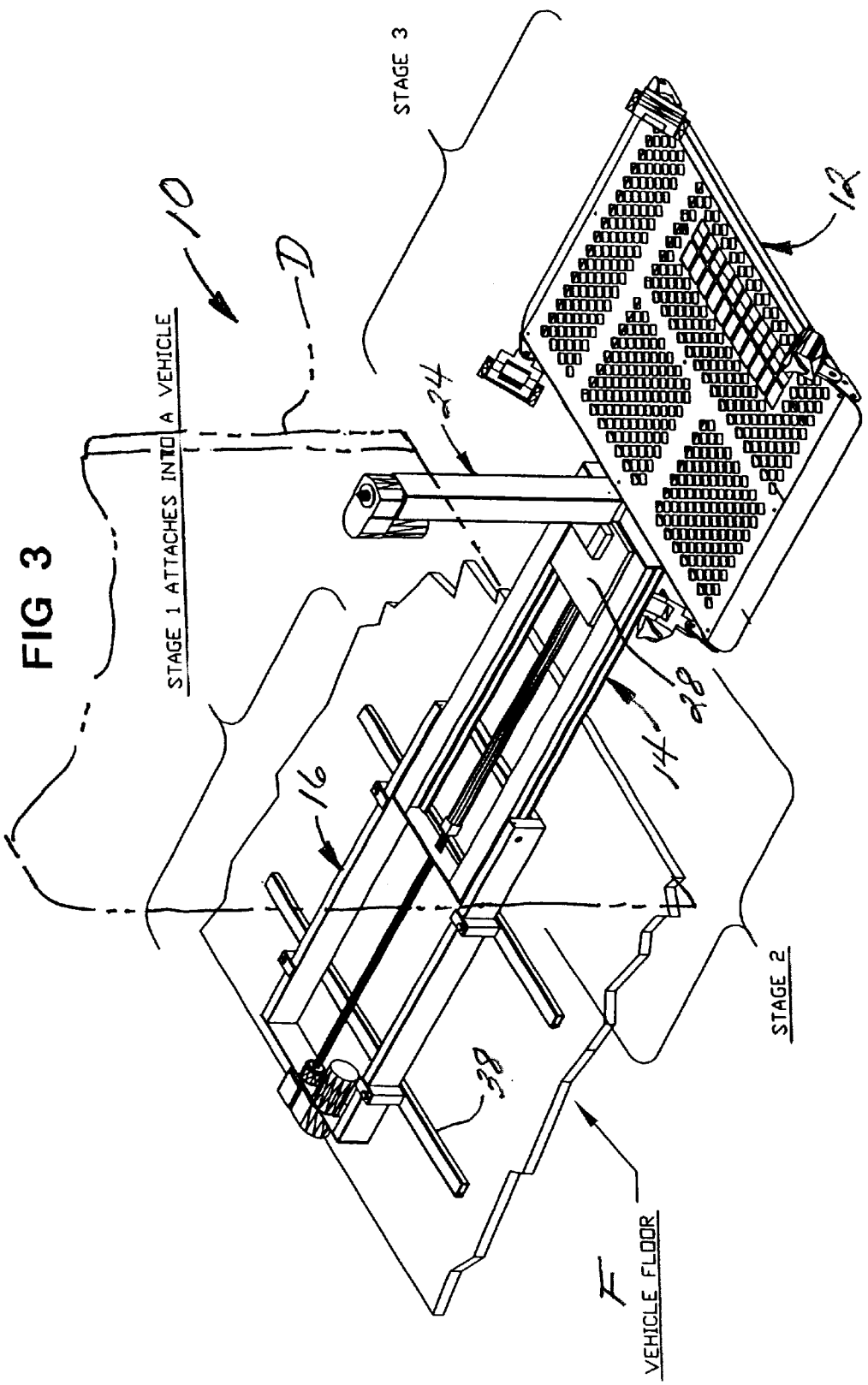
FIG. 3 is a perspective partially broken view of the vehicle and door opening (in phantom) showing the invention fully extended rearwardly with the platform in the upper position.

The invention 10 further includes an elongated stationary frame member 16 which, as best seen in FIG. 3, is connected atop the floor F of the vehicle, preferably a van or minivan or SUV. The stationary frame member 16 is positioned just forwardly of the rear door opening D inside the vehicle. Anchoring bars 38 are utilized to facilitate rigid attachment of the stationary frame member 16 in a fore and aft orientation to the vehicle floor F.

Figure 4:
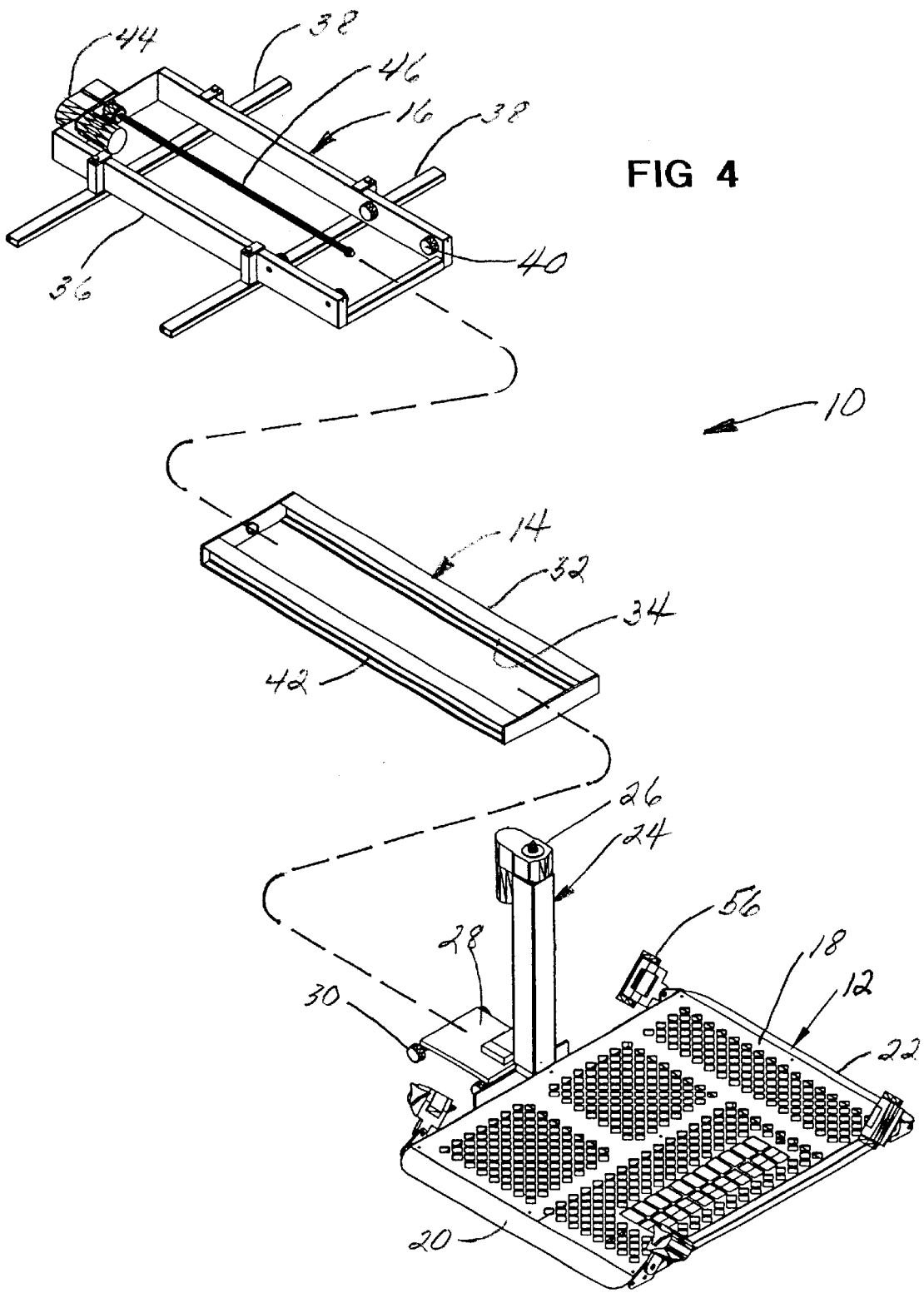
FIG. 4 is an exploded perspective view of the invention.

The invention 10 further includes a moveable frame member 14 which is slidably or rollably moveable in the direction of arrow A in FIG. 2. As seen in FIG. 4, rollers 40, attached to the inner surfaces of the longitudinal frame portions 36 of the stationary member 16, rollably engage with mating slots or channels 42 formed into the outer surfaces of the longitudinal frame portions 32 of the moveable frame member 14. This moveable support arrangement facilitates free linear movement of the moveable member 14 with respect to the stationary member 16.

The platform assembly 12 includes a horizontal plate 28 which extends forwardly of the forward edge of the platform 12 and an upright powered lift mechanism 24. The plate 28 includes rollers 30 which rollably engage within inner channels 34 formed into the longitudinal inner facing surfaces of frame members 32 of the moveable frame member 14.

Figure 1:
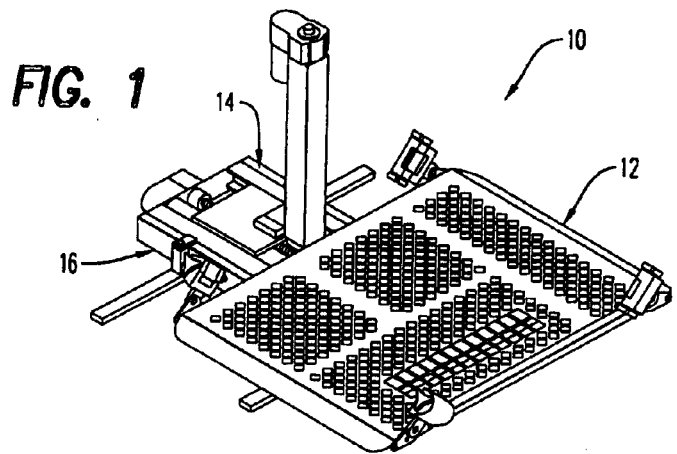
FIG. 1 is a perspective view of the invention in a stored and retracted position.

The plate 28 is rigidly connected to the upper section 50 of the lift mechanism 24 which also includes a slidable mating intermediate section 52 and a slidable mating lower telescoping section 54. An internal screw jack arrangement is powered by a drive mechanism 26 to effect the reciprocal telescoping extension of the lift mechanism 24 from its collapsed or shortened position shown in FIG. 1 to the fully extended position shown in FIG. 2.

Figure 7:
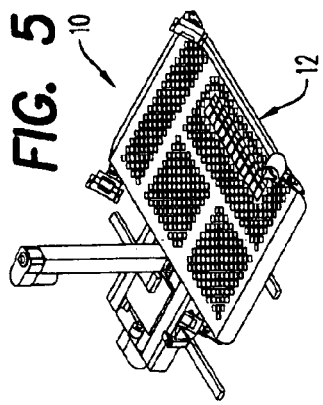
Figure 8:
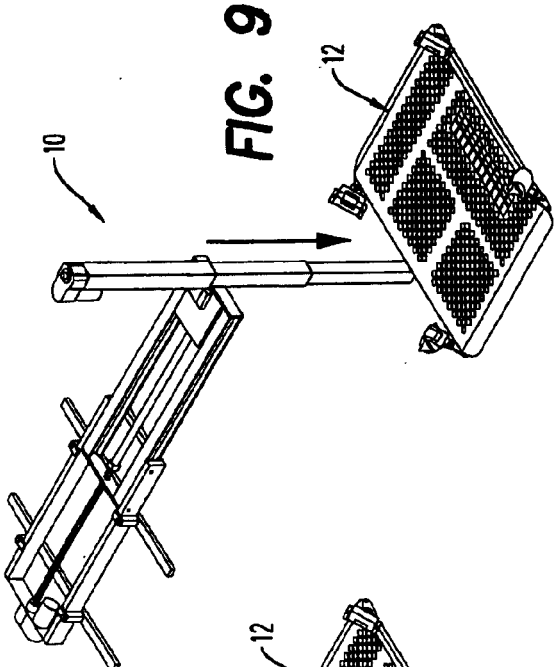
Figure 9:
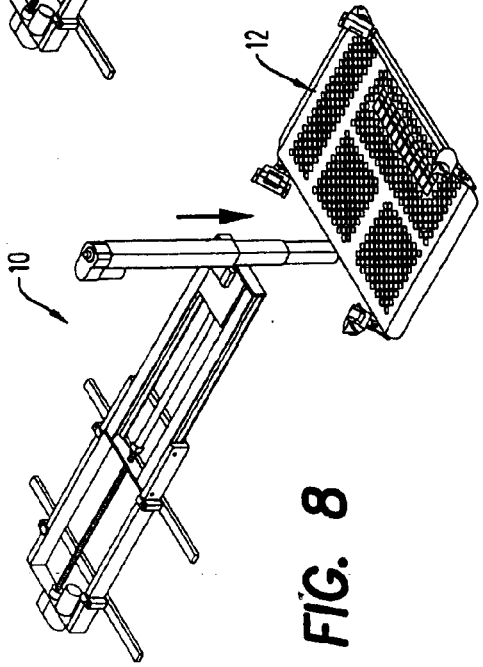

A separate motorized drive mechanism 44 in driving engagement with an elongated jackscrew 46 causes the moveable stationary frame member 14 to move fore and aft in the direction of arrow A in FIG. 2 with respect to the vehicle and longitudinally with respect to the stationary frame member 16 in response to operation of drive mechanism 44. Likewise, a second elongated threaded jack screw 48, in operable engagement with the first jack screw 46, causes the plate 28 and the entire upright lift mechanism 24 to reciprocate within the moveable frame member 14 in the direction of arrow B. By this arrangement, the controlled coplanar fore and aft movement of the moveable frame member 14 within the stationary frame member 16, and the platform 12 and lift mechanism 24 within the guide rails 34 of the moveable frame member 14, from the fully stored or retracted position of FIG. 5 to the fully deployed position of FIGS. 7, 8 and 9 is accomplished.

Viewed another way as shown in FIG. 3, the invention may be described as comprising three separate stages. Stage one is characterized as including the stationary frame member 16 which is attached to the floor F of the vehicle as previously described. Stage two may be referred to as including the moveable frame member 14 which is slidably and telescopically supported and moveable with respect to the stationary frame member 16. Stage three may be characterized as including the lift platform 12 and the lift mechanism 24 including the horizontal plate 28 rigidly attached thereto and which is slidably translatable fore and aft with respect to the moveable frame member 14.

Figure 5:
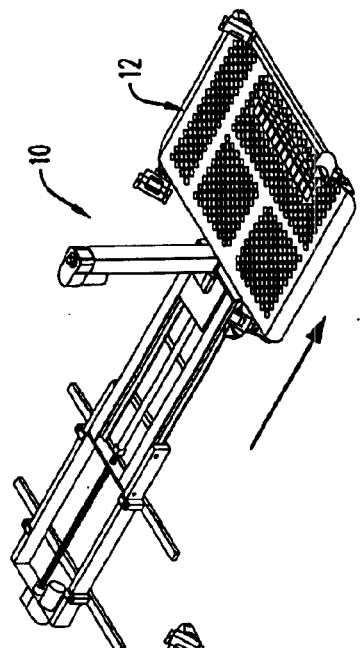
FIGS. 5 to 9 depict the various stages of deployment of the invention from its stored position in FIG. 5 to its fully deployed position in FIG. 9.
Figure 6:
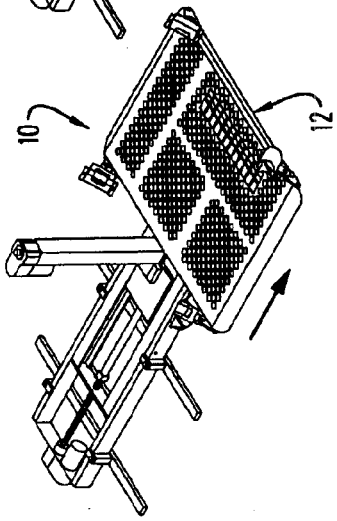

The invention 10 is deployed sequentially starting as shown in FIG. 5 with the platform 12 in its stored position within the vehicle. As the drive mechanism 44 is operated, the platform 12 is gradually extended rearwardly and fore and aft with respect to the vehicle to its fully extended position in FIG. 7. Thereafter, as shown in FIG. 8, the platform 12 is slowly moved downwardly by the operation of drive mechanism 26 to a fully deployed downwardly position of FIG. 9, wherein the platform 12 is positioned atop the ground ready to receive a personal mobility vehicle. Sequential reversal of these steps then accomplishes the full storage of the personal mobility vehicle atop the platform 12 within the vehicle through the door opening D.

Although the drive mechanisms 44 and 26 are described as rotatably driving elongated screw jacks, alternate power means are envisioned to be substituted therefor within the scope of this invention so long as the slidable translation of the moveable frame member 32 within the stationary frame member 16 and the linearly rollable translation of plate 28 of the lift mechanism 24 are included in any substitution.

While the instant invention has been shown and described herein in what are conceived to be the most practical and preferred embodiments, it is recognized that departures may be made therefrom within the scope of the invention, which is therefore not to be limited to the details disclosed herein, but is to be afforded the full scope of the claims so as to embrace any and all equivalent apparatus and articles.

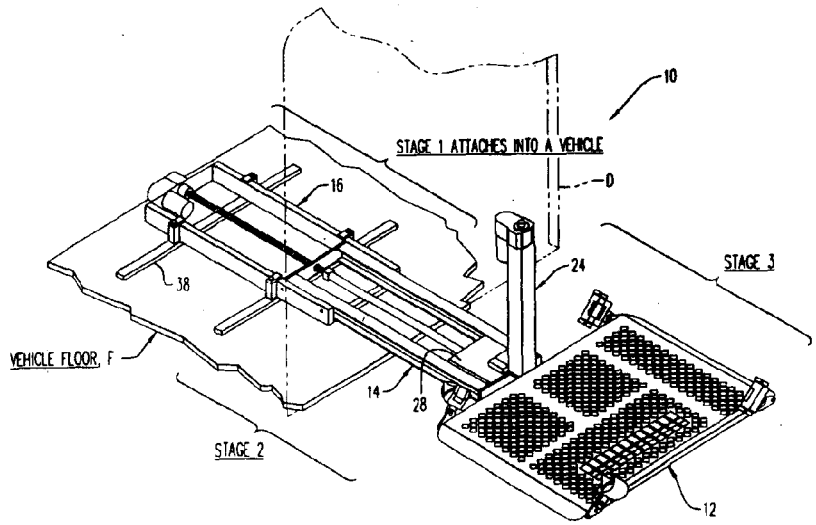

What is claimed is:

1. A personal mobility vehicle lift for use in conjunction with a vehicle having a door opening and a floor comprising:

a generally horizontal platform structured to support a personal mobility vehicle thereatop;

an upright powered lift mechanism connected to said platform for raising and lowering said platform when said platform is rearwardly positioned outside the vehicle, said platform moving between a lower position in proximity to the ground and an upper position in proximity to the level of the floor;

an elongated stationary frame member structured for rigid connection atop the floor of the vehicle;

an elongated moveable frame member slidably connected to said stationary frame member for linear movement along and lengthwise to said stationary frame;

said moveable frame member slidably connected to said lift mechanism for linear movement of said lift mechanism along and lengthwise to said moveable frame member;

a drive mechanism operably interconnecting said stationary and moveable frame members and said lift mechanism for controlling relative linear movement therebetween whereby, when said platform is in the upper position, said platform and said moveable frame member are controlledly reciprocally moveable linearly from the extended position beyond the floor and outside the vehicle inwardly through the door opening to a retracted position above and in close proximity to the floor and within the vehicle.

2. A personal mobility vehicle lift for use in conjunction with a vehicle having a door opening and a floor comprising:

a generally horizontal platform structured to receive a personal mobility vehicle driven or rolled thereatop;

an elongated telescoping upright powered lift mechanism connected to said platform for raising and lowering said platform in an upright linear motion between a lower position in proximity to the ground and an upper position in proximity to the level of the floor when said platform is in a rearwardly position behind the vehicle;

an elongated stationary frame member structured for rigid connection atop, and oriented lengthwise to, the floor of the vehicle;

an elongated moveable frame member slidably or rollably connected to said stationary frame member for reciprocal fore and aft movement of said moveable frame member with respect to said stationary frame member and the floor;

said moveable frame member moveably connected to said vertical lift member for slidable or rollable linear fore and aft movement therebetween;

a drive mechanism operably connected between said stationary and moveable frame members and said lift member for controlling relative telescoping movement therebetween whereby, when said platform is in the upper position, said platform is controlledly moveable from the rearward position beyond the floor and the rear of the vehicle through the door opening to a forward position wherein said platform is positioned above and in close proximity to the stationary and moveable frame members and within the vehicle.

3. A personal mobility vehicle lift connectable to a floor of a vehicle having a door opening comprising:

an elongated stationary frame member structured for rigid connection atop, and oriented fore and aft to, the floor of the vehicle;

an elongated moveable frame member connected to said stationary frame member for limited fore and aft rolling or sliding movement rearwardly from said stationary frame member;

a generally horizontal platform structured to support a personal mobility vehicle thereatop;

an upright multiple-tube telescoping lift mechanism connected to said platform for raising and lowering said platform when said platform is in a rearwardly position behind the vehicle between a lower position in proximity to the ground whereby the wheelchair may be moved or driven onto said platform from the adjacent ground and an upper position in close proximity to the level of the floor;

said moveable frame member connected to and supporting said lift member for fore and aft rolling or sliding movement only therebetween rearwardly from said moveable frame member;

a drive mechanism operably interconnected between said stationary and moveable frame members and said upright lift member for controlling telescopic movement therebetween whereby, when said platform is in the upper position, said platform is controlledly moveable from the rearward position beyond the floor and the rear of the vehicle through the door opening to a forward position above or atop the floor and within the vehicle wherein said platform is positioned in close proximity above said frame members.

* * * * *

UNITED STATES PATENT AND TRADEMARK OFFICE
CERTIFICATE OF CORRECTION

| | | |
|---|---|---|
| PATENT NO. | : 6,726,435 B1 | |
| APPLICATION NO. | : 10/267260 | |
| DATED | : April 27, 2004 | |
| INVENTOR(S) | : Chad Williams et al. | |

It is certified that error appears in the above-identified patent and that said Letters Patent is hereby corrected as shown below:

The title page should be deleted and substitute therefore the attached title page.

Drawings:

Delete Drawing Sheets 1-4, and substitute therefore the Drawing Sheet, consisting of Figs. 1-9 as shown on the attached pages.

Signed and Sealed this

Twenty-second Day of August, 2006

JON W. DUDAS
*Director of the United States Patent and Trademark Office*

United States Patent
Williams et al.

(10) Patent No.: US 6,726,435 B1
(45) Date of Patent: Apr. 27, 2004

(54) LIFT FOR A PERSONAL MOBILITY VEHICLE OR WHEELCHAIR

(75) Inventors: Chad Williams, Sarasota, FL (US); Jeff DuVal, Sarasota, FL (US)

(73) Assignee: Chadco Enterprises, Inc., FL (US)

(*) Notice: Subject to any disclaimer, the term of this patent is extended or adjusted under 35 U.S.C. 154(b) by 0 days.

(21) Appl. No.: 10/267,260

(22) Filed: Oct. 8, 2002

(51) Int. Cl.$^7$ ............................................. B60P 1/00
(52) U.S. Cl. .................. 414/542; 414/497; 414/560; 414/921
(58) Field of Search ........................ 414/495–497, 414/542, 560, 921

(56) References Cited

U.S. PATENT DOCUMENTS

| | | |
|---|---|---|
| 4,140,230 A | 2/1979 | Pearson |
| 4,408,948 A | 10/1983 | Robinson |
| 4,984,955 A | 1/1991 | McCullough |
| 5,261,779 A | 11/1993 | Goodrich |
| 5,308,214 A * | 5/1994 | Crain et al. ............... 414/921 |
| 5,401,135 A | 3/1995 | Stoen et al. |
| 5,556,250 A | 9/1996 | Fretwell et al. |
| 5,564,884 A | 10/1996 | Farsai |
| 5,672,041 A | 9/1997 | Ringdahl et al. |
| 5,674,043 A | 10/1997 | Dorn |
| 5,806,632 A | 9/1998 | Budd et al. |
| 5,944,473 A | 8/1999 | Saucier et al. |
| 6,086,314 A | 7/2000 | Savaria |
| 6,357,992 B1 | 3/2002 | Ringdahl et al. |
| 6,379,102 B1 | 4/2002 | Kameda |
| 2001/0026756 A1 | 10/2001 | Mortimore |

* cited by examiner

*Primary Examiner*—Joseph E. Valenza
(74) *Attorney, Agent, or Firm*—Charles J. Prescott

(57) ABSTRACT

A personal mobility vehicle lift for a vehicle having a door opening and a floor. The personal mobility vehicle lift includes a platform for supporting a personal mobility vehicle (PMV) thereatop. An upright preferably telescoping lift mechanism raises and lowers the platform in an up and down motion. An elongated stationary frame member is structured for connection atop and oriented preferably parallel to the floor of the vehicle. An elongated moveable frame member is connected to the stationary frame member preferably for reciprocal lengthwise movement. The moveable frame member is connected to the lift mechanism for reciprocal lengthwise movement. A drive mechanism operably interconnects the stationary and moveable members and the lift member whereby, when the platform is in the upper position, the platform is moveable from its outside position through the door opening into the vehicle.

3 Claims, 4 Drawing Sheets